United States Patent [19]
Yamaji et al.

[11] 3,985,280
[45] Oct. 12, 1976

[54] METHOD OF JOINTING COPPER PIPE TO ALUMINUM PIPE BY SOLDERING

[75] Inventors: Kenkichi Yamaji; Dietrich Oelhschlagel; Hajime Abe, all of Hitachi, Japan

[73] Assignee: Hitachi Cable, Ltd., Japan

[22] Filed: June 19, 1975

[21] Appl. No.: 588,361

[52] U.S. Cl. ............................................. 228/110
[51] Int. Cl.² ....................................... B23K 1/06
[58] Field of Search .......... 228/110, 111, 154, 208, 228/262, 1, 27, 28

[56] References Cited
UNITED STATES PATENTS
3,760,481   9/1973   Greever ............................ 228/36 X Primary Examiner—Al Lawrence Smith
Assistant Examiner—Margaret Joyce
Attorney, Agent, or Firm—Craig & Antonelli

[57] ABSTRACT

A method of jointing a copper pipe to an aluminum pipe by soldering, comprising the steps of:
 flaring one end of one of said two pipes and applying a solder-cover to at least one end of the other pipe;
 coupling each one end of both pipes to each other;
 heating each one end of both pipes;
 imparting ultrasonic vibrations to the coupled portion while solder is molten at the coupled portion; and
 cooling said coupled portion.

8 Claims, 4 Drawing Figures

METHOD OF JOINTING COPPER PIPE TO ALUMINUM PIPE BY SOLDERING

BACKGROUND OF THE INVENTION

This invention relates to a method of jointing a copper pipe to an aluminum pipe by soldering, more particularly, forming a joint between said two pipes:

In forming a joint between a copper pipe and an aluminum pipe, it has hitherto been customary to carry out flash butt welding because it is almost impossible to directly joint said two types of pipes. However, according to the above method, shortcomings have been presented that a sound joint is difficult to obtain and moreover a larger number of man-hour is required for removing burrs produced at the inner periphery of the joint.

In view of the above, the present invention is intended to provide a round and strong joint by soldering using ultrasonic vibrations.

SUMMARY OF THE INVENTION

The method according to the present invention comprises the steps of: preparing a copper pipe and an aluminum pipe, with one end of one of said two pipes being flared and at least one end of the other pipe being coated with a solder-coating; coupling each one end of both pipes to each other; heating each one end of both pipes; imparting ultrasonic vibrations to the coupled portion while the solder is molten at the coupled portion; and cooling said coupled portion. The above method is characterized in that: solder is padded between the two base metals of both pipes and by virtue of cavitation induced in the molten solder and at the boundary surfaces between the two base metals of both pipes and the molten solder by ultrasonic vibrations, both pipes can be jointed by soldering without using flux.

This invention is also characterized in that the difference in thermal expansion between said pipes can be utilized, thereby permitting to minimize the gap between the interfaces of said pipes and to make the solder joint stronger.

The other features will be apparent in the description to be made hereinafter.

DESCRIPTION OF THE PREFERRED EMBODIMENT

Figure 1:
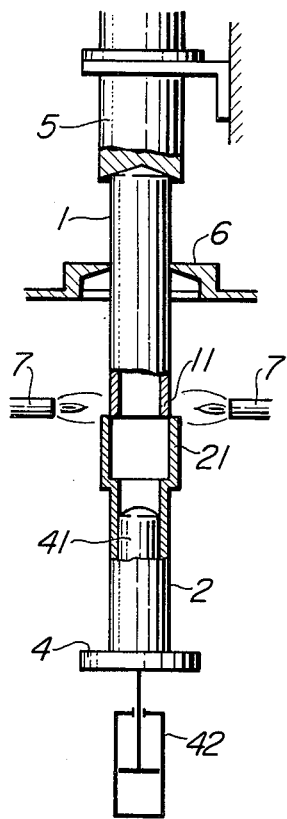
FIG. 1 is an explanatory view showing one embodiment of the present invention.

Referring to FIG. 1, 1 designates an aluminum pipe. 2 is a copper pipe having a flared end portion 21. The flared end portion 21 is formed to have a slightly larger inner diameter than the outer diameter of the end portion 11 of the pipe 1 by using a flaring method of the known art, and the boundary 22 between the flared end portion 21 and the non-flared portion makes an obtuse angle close to a right angle with the axis of the pipe. Thus boundary 22 has such an advantage that the end portion 11 is prevented from being deformed or tapered when coupled to the flared end portion 21, thereby preventing the end portion 11 from being pushed and or from projecting into the pipe 2.

Figure 2:
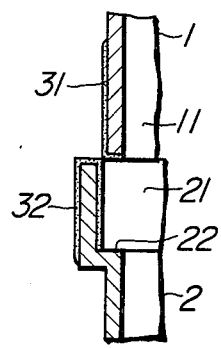
FIG. 2 is a partial cross-sectional view showing end portions of pipes in use prior to coupling.

As shown in FIG. 2, at the end portions 11 and 21 of both pipes a layer of solder suitable for jointing copper to aluminum, e.g., zinc layers 31 and 32 containing aluminum in small quantities, is applied. Said layers 31 and 32 can be readily applied by using a plating or hot dipping method.

There is no harm for providing a solder coating at one or the other of two positions, only if a pre-determined quantity of solder can be secured either at a position inside the flared end portion 21 or at a position outside the end portion 11.

Both pipes are thus prepared, and the rear end of the copper pipe 2 is coupled onto a stem 41 placed on a supporting plate 4, and the aluminum pipe 1 is placed over the flared end portion 21 with the end portion 11 down.

Figure 3:
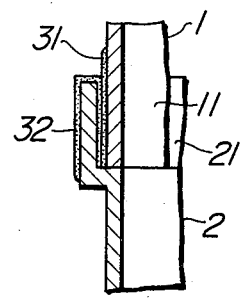
FIG. 3 is a partial cross-sectional view of the coupled state of both pipes.

The supporting plate 4 is adapted to be move up and down by means of a cylinder 42 provided therewith. Placed above the supporting plate 4 are an ultrasonic horn 5 for imparting ultrasonic vibrations to the coupled portion of both pipes and a supporting member 6 for maintaining the pipe 1 uprightly. Accordingly, when the pipes 1 and 2 are set at the pre-determined positions and then the cylinder 42 is actuated, the supporting plate 4 moves upwards, the movement of the rear end of the aluminum pipe 1 is checked by the supersonic horn 5, and the end portions 11 and 21 are coupled to each other as shown in FIG. 3. By this coupling the solder coating 31 and 32 are rubbed with each other and have the oxide film on their surfaces damaged, thereby attaining a certain degree of adhesion therebetween. Disposed radially around the position where the coupled portion is situated are a plurality of burners 7 for heating the coupled portion uniformly.

The burners 7 are ignited before coupling of the end portions 11 and 21, and are adapted to control the flames therein. The layers of solder on the end portions 11 and 21 may be heated by the burners 7 to a temperature near or slightly above the melting point of the solder to allow the coupling of said end portions to be done with only a small force and to provide only a small gap between the bare metals of said end portions.

As shown in FIG. 3, when coupling of the end portions 11 and 21 is carried out and heating by the burners 7 is progress, the solder layers 31 and 32 become molten. When the ultrasonic horn 5 is energized, ultrasonic vibrations are imparted to the coupled portion through pipe 1. The ultrasonic vibrations cause the solder layer situated on the end portion 11 of pipe 1 to flow into the coupled portion and provides by imparting ultrasonic vibrations to the molten solder and by virtue of cavitation for a sound metallurgical bonding of the solder layers 31 and 32 with each other and of the solder with the surfaces of the end portions 11 and 21. In this way a perfectly soldered joint is obtained as shown in FIG. 4.

At this time, the end portion 11 of the aluminum pipe, having a larger thermal expansion coefficient than the copper pipe 2, expands slightly though, to thereby make narrower the gap formed between the flared end portion 21 and the end portion 11. As the result, molten solder is spread throughout the coupled portion by virtue of expansion pressure and capillarity, thereby enhancing the action of ultrasonic vibrations.

Figure 4:
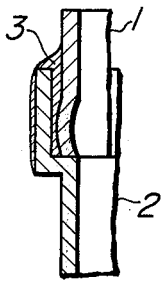
FIG. 4 is a partial cross-sectional view of a joint obtained according to the method of the present invention.

Although the end portion 11 of the aluminum pipe, which has a lower mechanical strength than the copper pipe 2 is liable to deformation upon being affected by heat and also by the pressure from the cylinder 42, the boundary 22 of the flared end portion 21, which confronts the end portion 11, intersects the non-flared portion thereof at about a right angle, and hence, the end portion 11 is not pushed into the copper pipe 2, and slightly deforms as shown in FIG. 4, thereby enhancing the spreading of the solder 3 in cooperation with thermal expansion.

Deformation of the end portion 11 may be enhanced by secondarily actuating the cylinder 42 when ultrasonic vibrations are imparted.

If ultrasonic vibrations are imparted for an excessively long period of time, there is such a danger that the wall of the end portion 11 made from aluminum may be dissolved into the solder whereby a portion of the wall may be decreased in effective thickness. Thus, after heating the coupled portion for a pre-determined period of time, ultrasonic vibrations are cut off, the coupled portion is cooled, the cylinder 42 is returned, the pipe 2 is removed from the stem 41, and a soldered joint shown in FIG. 4 can be obtained.

This joint has no voids remained therein, is filled with solder in satisfactory quantities, shows a very high mechanical strength, and is highly gastight and watertight.

Although this embodiment illustrates the case of jointing short pipes, jointing a short pipe to a long pipe can be also carried out by contriving a method of supporting the pipes and a method of imparting ultrasonic vibrations. Also coupling of the pipes to each other can be carried out in the manner that the pipes are turned the other way. In this case, the end portion of the aluminum pipe should be flared. However, if the end portion of the aluminum pipe is flared such that the inner diameter thereof is made in advance larger than the outer diameter of the copper pipe, then the gap at the time of heating becomes too large because of the difference in thermal expansion coefficient, thus resulting in much less effective use of ultrasonic vibrations. Accordingly, in such a case as above, the end portion of the aluminum pipe should be in advance flared in such a way that the inner diameter thereof tightly fits on the outer diameter of the end portion of the copper pipe when heated, and the flared end portion of aluminum pipe should be pre-heated prior to coupling. Then, the flared end portion of the aluminum pipe is coupled to the end portion of the copper pipe, and the heating temperature attained by means of the burners is lowered to a temperature comparatively lower but higher than the melting point of the solder, and after imparting ultrasonic vibrations, heating and ultrasonic vibrations are cut off. The flared end portion of the aluminum pipe, slightly though, contracts with fall of the heating temperature, thus resulting in a smaller gap in the coupled portion. Solder is effectively spread throughout the coupled portion by virtue of contracting pressure thereof and capillarity, thereby enhancing the action of ultrasonic vibrations. By subsequent cooling, the flared end portion of the aluminum pipe further contracts, and hence a more positive and stronger joint can be obtained.

As is apparent from the foregoing description, the method according to the present invention presents the following advantages. For operating convenience, solder provided in advance at the end portion or portions dispenses with the need of supplying solder at the time of heating. Furthermore, the difference in thermal expansion coefficient can be utilized for satisfactorily spreading solder throughout the gap formed between the coupling interfaces, so that a strong joint with high tightness can be obtained. Utilization of ultrasonic vibrations in soldering dispenses with the need of flux coating or finishing operations, and moreover, a highly reliable joint between the copper and aluminum pipes can be effectively produced. The method is highly evaluated in industries.

What is claimed is:

1. A method of making a joint between a copper pipe member and an aluminum pipe member comprising the steps of
    a. flaring one end of one of said pipe members in such a way that one end of the other pipe member can be inserted into the flared portion, leaving a clearance therebetween to provide inner and outer overlapping portions defining a joint area;
    b. coating at least one end of said pipe members to be joined with a layer of solder;
    c. inserting the end of one of said pipe members into the flared end of the other of said pipe members, so that the solder coating is present between said inner and outer overlapping portions of the joint area;
    d. positioning the assembled pipe members so that the open end of the flared outer pipe member is disposed upwardly;
    e. heating the assembled pipe members so that at least the portion of the ends of the pipe members precoated with solder reach a temperature of at least the melting point of the solder;
    f. applying ultrasonic vibrations directly to a portion of at least one of said pipe members so that the ultrasonic vibrations are transmitted to the joint area through the pipe member, while the solder is molten in the clearance of the joint area;
    g. cooling said pipe members after terminating the ultrasonic vibrations to solidify the solder in the joint area.

2. A method as defined in claim 1, wherein one end portion of the copper pipe member is flared and solder coatings are applied to both the flared end portion of the copper pipe member and one end portion of the aluminum pipe member.

3. A method as defined in claim 1, wherein one end portion of the aluminum pipe member is flared and solder coatings are applied to both the flared end portion of the aluminum pipe member and one end portion of the copper pipe member.

4. A method as defined in claim 1, wherein said flared end portion includes a base which forms an obtuse angle approximating a right angle with the axis of the pipe member.

5. A method as defined in claim 1, wherein the end of one of said pipe members is inserted into the end of the other of said pipe members after at least one of said pipe members is heated so that at least the end to be joined reaches a temperature near or slightly above the melting point of the solder whereby the force required for the insertion of the one end into the other end of said pipe members is reduced.

6. A method as defined in claim 1, wherein one end portion of the copper pipe member is flared and a pressure is applied to one of the pipe members in a direction parallel to the axis of the pipe members and ultrasonic vibrations are applied to the open end of the other pipe member in a direction parallel to the pipe axis while the solder is molten in the clearance of the joint area so that the end portion of the aluminum pipe inside the overlapping portion of the joint area slightly deforms thereby enhancing the spreading of the solder inside said overlapping portion.

7. A method as defined in claim 1, wherein the end of one of the pipe members, to be inserted into the flared end portion of the second pipe member, is coated with solder over an axial distance greater than the length of the overlap between the members at the joint area so that the solder disposed axially beyond said overlap flows into the clearance between the inner and outer overlapping portions of the joint area after heating the assembled pipe members, so that at least the portion of the ends of the pipe members precoated with solder reach at least the melting point of the solder, subsequent to applying ultrasonic vibrations.

8. A method as defined in claim 1, wherein the ultrasonic vibrations are applied directly to the end of at least one of said pipe members in a direction parallel to the pipe axis.

* * * * *